United States Patent [19]

Cohen et al.

[11] 4,086,436
[45] Apr. 25, 1978

[54] TRANSMIT AND RECEIVE DIGITAL DATA CHANNEL ELASTIC STORE

[75] Inventors: Stuart Barry Cohen, Nutley; James Monroe Clark, Cedar Grove; Arthur Howard Magnus, Succasunna, all of N.J.

[73] Assignee: International Telephone and Telegraph Corporation, Nutley, N.J.

[21] Appl. No.: 711,766

[22] Filed: Aug. 4, 1976

Related U.S. Application Data

[63] Continuation of Ser. No. 541,558, Jan. 16, 1975, abandoned.

[51] Int. Cl.² .............................................. H04J 3/04
[52] U.S. Cl. ........................... 179/15 AF; 179/15 BV
[58] Field of Search ...................... 179/15 AF, 15 BV; 178/50

[56] References Cited

U.S. PATENT DOCUMENTS

| | | | |
|---|---|---|---|
| 3,569,631 | 3/1971 | Johannes et al. | 179/15 AF X |
| 3,663,760 | 5/1972 | De Witt | 179/15 AF X |
| 3,868,481 | 2/1975 | Patrusky et al. | 179/15 AF X |
| 3,873,773 | 3/1975 | Guy, Jr. | 179/15 AF X |

*Primary Examiner*—Harvey E. Springborn
*Attorney, Agent, or Firm*—John T. O'Halloran; Alfred C. Hill

[57] ABSTRACT

Each of first N flip-flop stages, where N is an integer greater than one, has steered thereto an appropriate one of N bits of the data to be transmitted by a transmit write counter and a first N stage decoder under control of a transmit write clock. A transmit read counter under control of a transmit read clock steers the stored bits to a transmit data bus by means of a first multiplexer and first logic circuitry under control of a transmit read counter and a transmit channel timing signal. Each of second N flip-flop stages has steered thereto an appropriate one of N bits of received data by a receive write counter and a second N stage decoder under control of a receive write clock. A receive read counter under control of a receive read clock steers the stored bits to a receive data bus by means of a second multiplexer and second logic circuitry under control of the receive read counter.

27 Claims, 4 Drawing Figures

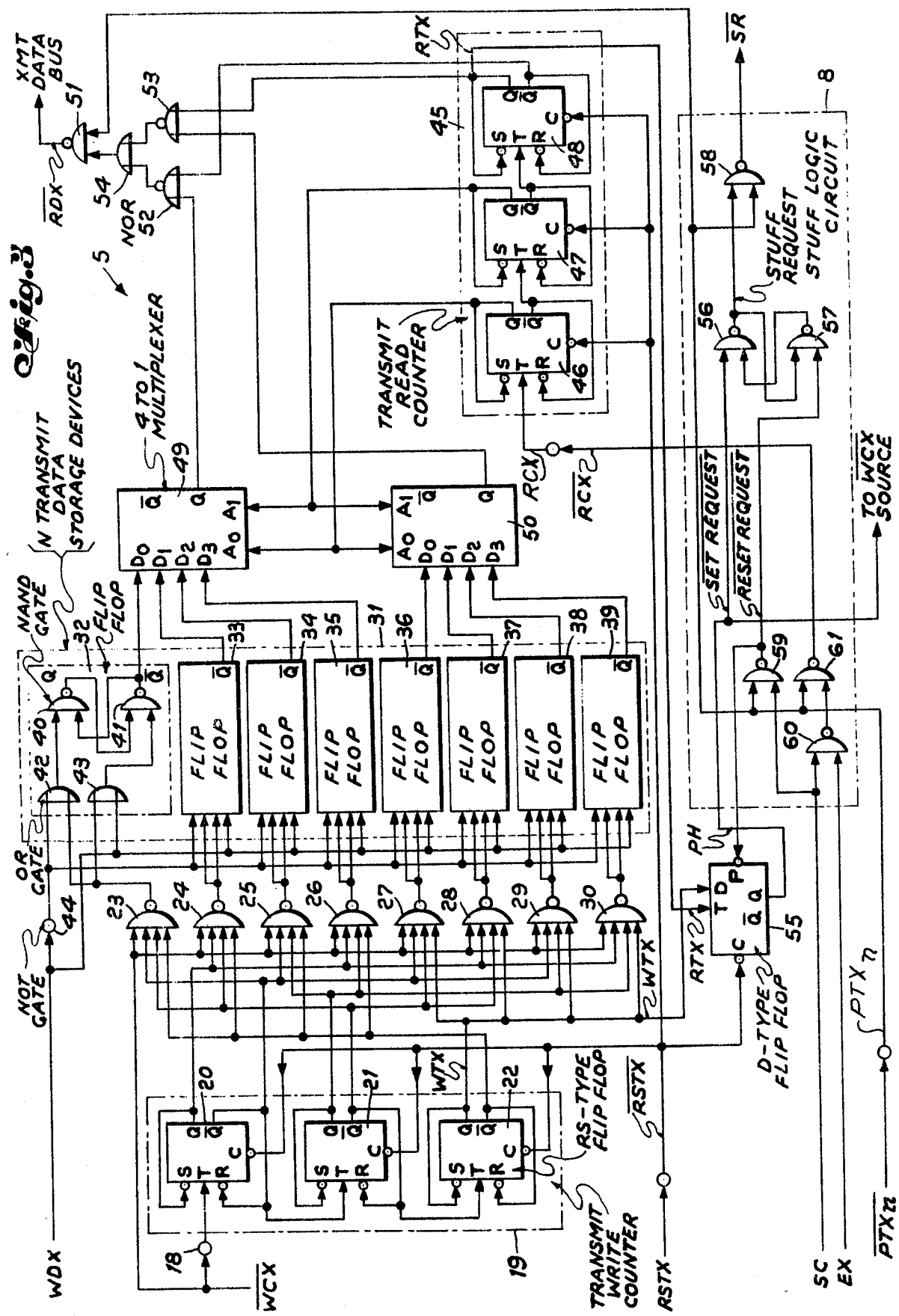

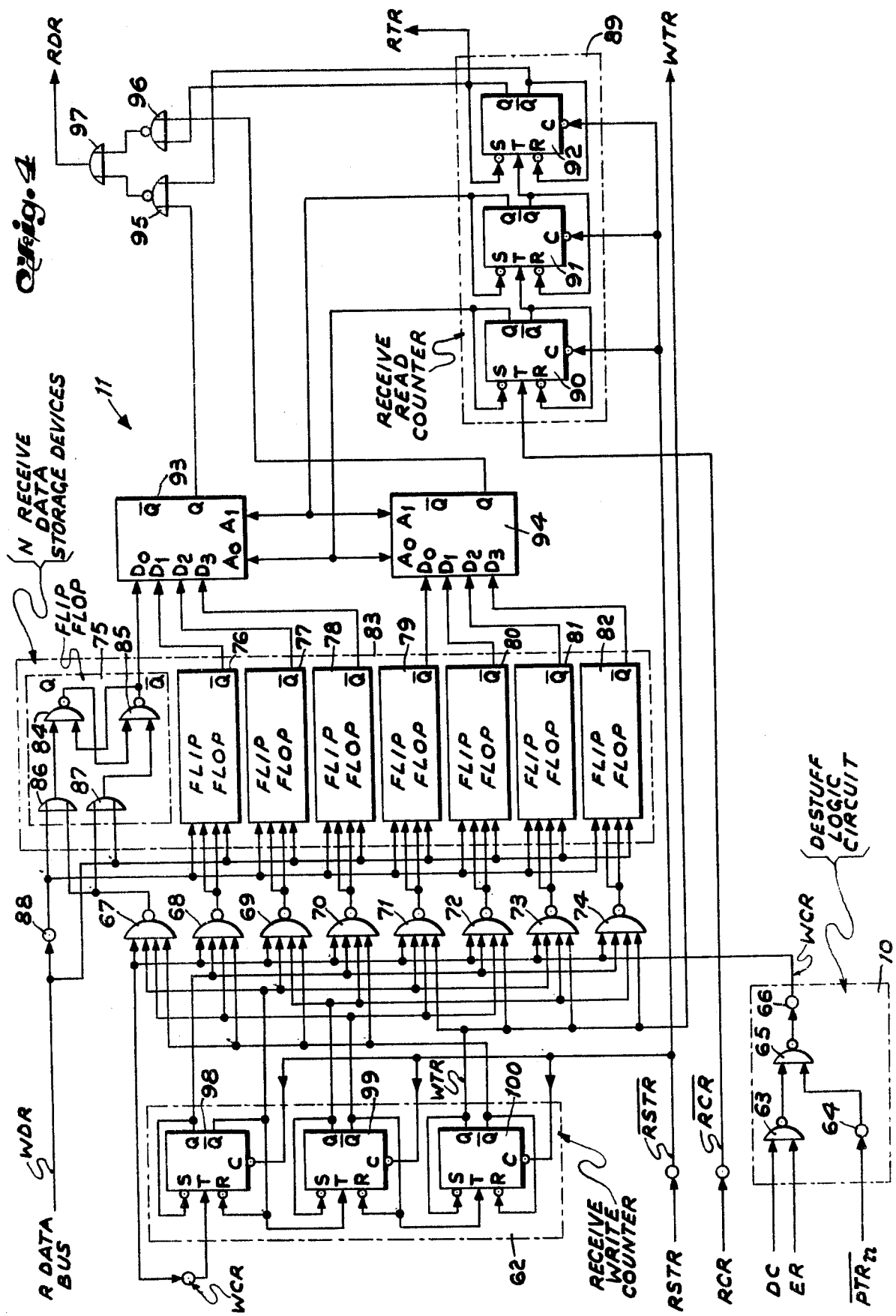

TRANSMIT AND RECEIVE DIGITAL DATA CHANNEL ELASTIC STORE

CROSS-REFERENCE TO RELATED APPLICATIONS

This is a continuation of application Ser. No. 541,558, filed Jan. 16, 1975 which is now abandoned.

BACKGROUND OF THE INVENTION

This invention relates to digital data time division multiplex (TDM) systems and more particularly to transmit and receive channel elastic stores employed in such systems.

SUMMARY OF THE INVENTION

An object of the present invention is to provide a combined digital data transmit and receive channel elastic store for employment in digital data TDM systems.

Another object of the present invention is to provide a digital data channel elastic store handling both transmitted and received digital data for employment in digital data systems.

A feature of the present invention is the provision of a transmit and receive digital data channel elastic store comprising: a first source of N-bit data to be transmitted, where N is an integer greater than one; a second source of transmit write clock; first N flip-flop stages coupled in parallel to the first source; a transmit write counter coupled to the second source; a first N stage decoder coupled to the second source, the transmit write counter and each of the first N flip-flop stages to steer each of the bits of the N-bit data to be transmitted into an appropriate different one of the first N flip-flop stages; a third source of transmit read clock; a transmit read counter coupled to the third source; a first multiplexer coupled to the transmit read counter and to the first N flip-flop stages to steer each of the bits stored in the first N flip-flop stages to a transmit data bus; a fourth source of N-bit received data; a fifth source of receive write clock; second N flip-flop stages coupled in parallel to the fourth source; a receive write counter coupled to the fifth source; a second N stage decoder coupled to the fifth source, the receive write counter and each of the second N flip-flop stages to steer each of the bits of the N-bit received data into an appropriate different one of the second N flip-flop stages; a sixth source of receive read clock; a receive read counter coupled to the sixth source; and a second multiplexer coupled to the receive read counter and to the second N flip-flop stages to steer each of the bits stored in the second N flip-flop stages to a receive data bus.

BRIEF DESCRIPTION OF THE DRAWING

Above-mentioned and other features and objects of this invention will become more apparent by reference to the following description taken in conjunction with the accompanying drawing, in which:

FIGS. 3 and 4 is the logic diagram of a combined elastic store for a digital data transmit and receive channel in accordance with the principles of the present invention.

DESCRIPTION OF THE PREFERRED EMBODIMENT

Figure 1:
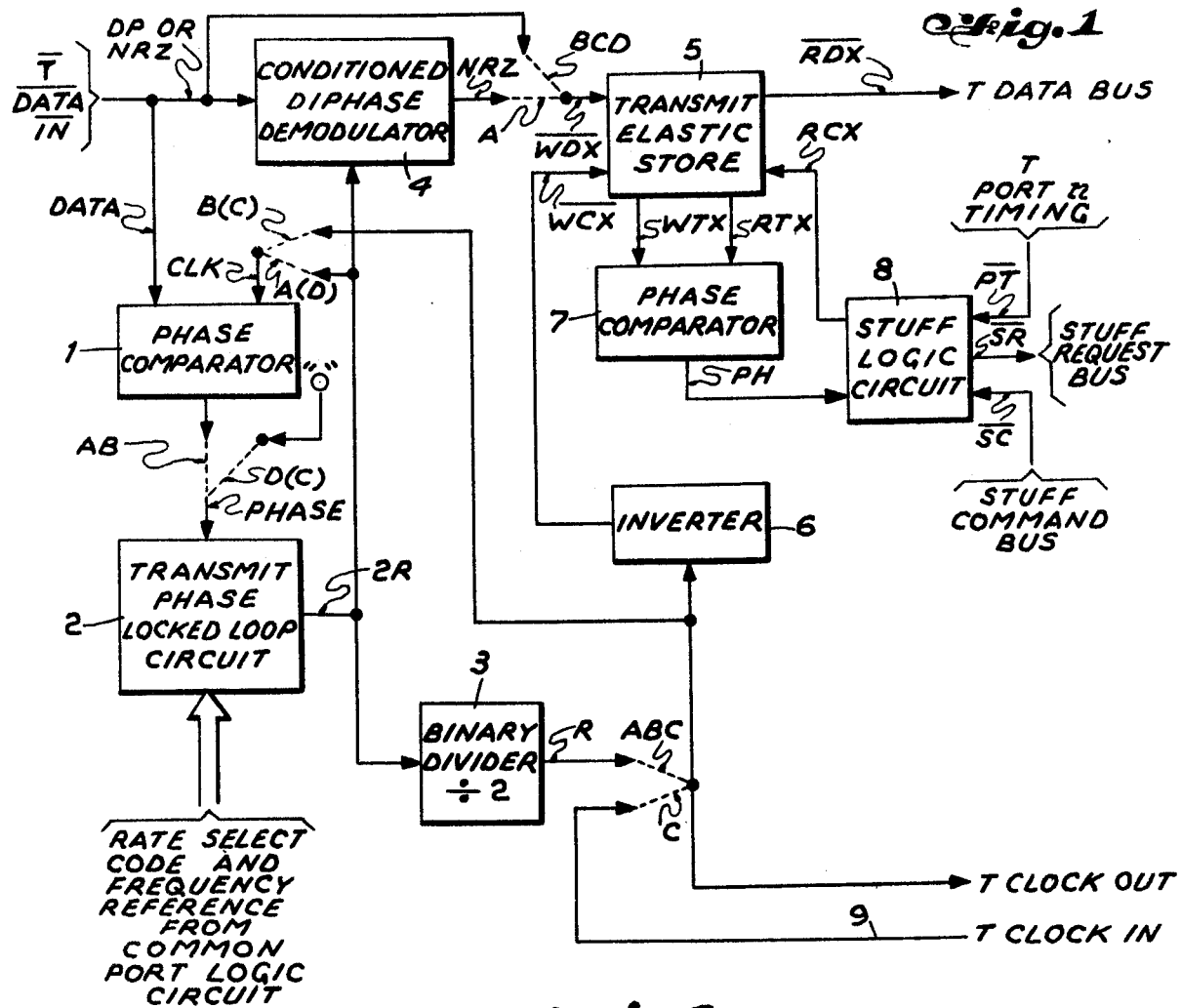
FIG. 1 is a block diagram of a transmit channel including a transmit elastic store in accordance with the principles of the present invention.
Figure 2:
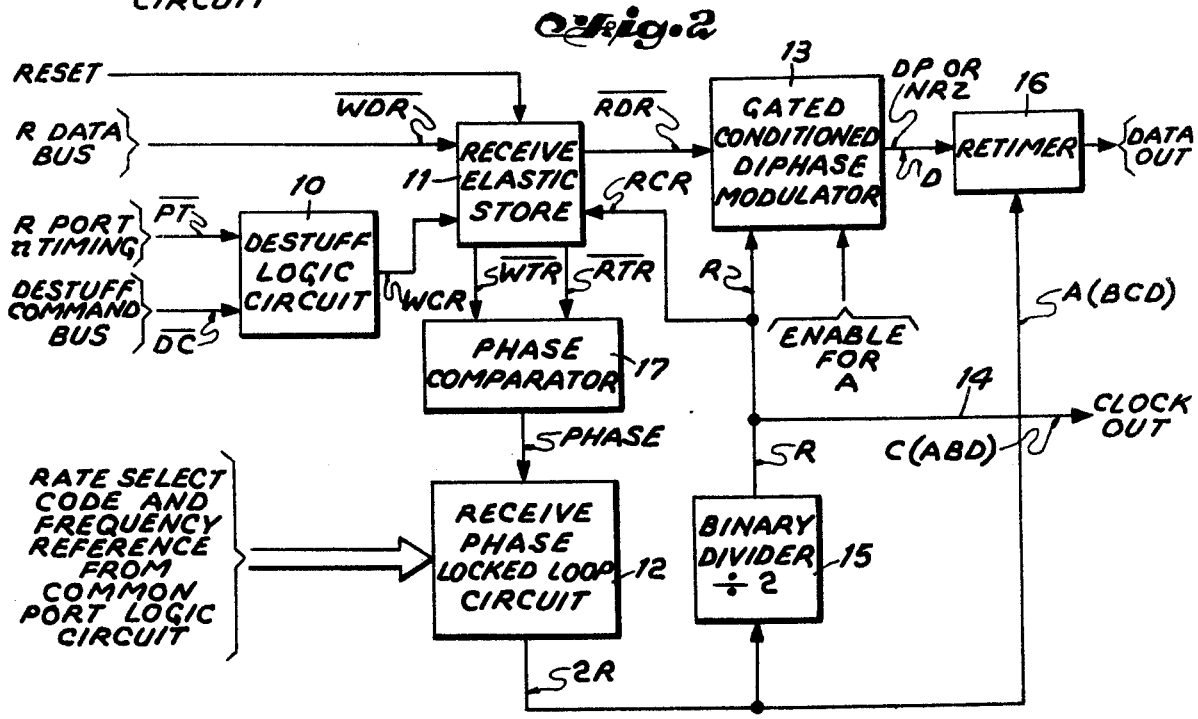
FIG. 2 is a block diagram of a receive channel including a receive elastic store in accordance with the principles of the present invention.

FIGS. 1 and 2 are block diagrams of a transmit channel or port demodulator and receive channel or port modulator that may be used in, and is described as if used in, the multiplexer and demultiplexer disclosed in a first allowed copending patent application of J. M. Clark, S. B. Cohen and A. H. Magnus, Ser. No. 565,905, filed Apr. 7, 1975, now U.S. Pat. No. 3,982,077, whose disclosure directed to FIGS. 6A, 6B and 6C, when organized as disclosed in FIG. 6D, FIG. 8, FIG. 9 and FIG. 10 and the description thereof are incorporated herein by reference. It is to be noted, however, that these sub-systems may be employed as sub-systems of other types of digital data systems.

Referring to FIG. 1 there is disclosed therein a block diagram of a transmit channel circuit. Four modes, A, B, C, and D are possible by re-routing certain signals as shown by the broken lines. Mode A is used for CDP (conditioned diphase) data. Phase comparator 1 is connected to compare CDP data with the "2R" clock (twice the bit rate). The output of phase comparator 1 is connected to the transmit phase locked loop circuit 2, which selects either a high frequency reference 307.233 KHz (kilohertz) or a low frequency reference 307.167 KHz according to the phase error. The selection is allowed to change whenever the high and low frequency references are in phase which occurs at a 66.7 Hz (hertz) rate (the difference frequency between the high and low frequency references). By dividing down from the nominal 307.2 KHz clock in binary divider 3 the required bit rate "R" is obtained. The rate select code is strobed from the transmit rate select bus and stored in latches circuit 2, which control the selection of the bit rate.

The NRZ output of the CDP demodulator 4 is clocked into the transmit elastic store 5 by the extracted "R" (data rate) clock through inverter 6. Phase comparator 7 compares the phase of the write and read counters of elastic store 5, enabling the stuff logic circuit 8 to generate a stuff request pulse when elastic store 5 is less than half full. When the common stuff control logic (not shown) issues a stuff command pulse SC one read clock pulse is inhibited causing one data bit in the elastic store 5 to be read twice.

Mode B is not normally used. If necessary, however, mode B could be used to extract a clock from NRZ data for which a clock signal has not been provided.

Mode C is used for NRZ data, which is caused to by-pass demodulator 4. Phase locked loop circuit 2 is not used for mode C, because the transmit clock input 9 is used as the write clock for elastic store 5. The remaining circuitry operates the same as for mode A.

Mode D is used for TTY inputs. In this case phase comparator 7 is connected in a toggle mode (toggling between + and − phase error is equivalent to zero phase error). In this mode, phase locked loop circuit 2 operates at the nominal 307.2 KHz rate. This smooth clock is employed to sample the TTY data at 1200 Hz which minimizes the increase of TTY timing distortion.

Referring to FIG. 2, there is illustrated therein a block diagram of a receive channel circuit. For all modes the destuff logic circuit 10 inhibits the generation of a write clock pulse for receive elastic store 11 from a port timing pulse whenever a destuff command pulse occurs. The receive phase locked loop circuit 12 uses the same reference frequencies as transmit phase locked loop circuit 2 (FIG. 1), although the rate selection may be different. The 3 db (decibel) jitter bandwidth of receive phase locked loop circuit 12 has been computed to be 34.5 parts per million (0.0000345) of the bit rate. There is a provision to reset receive elastic store 11 to a half-full state when the framing circuit is out of sync. When frame synchronization is acquired, the receive elastic stores of all of the receive channel circuits start operating from the half-full state. Phase comparator 17 compares the phase of the receive write timing signal $\overline{WTR}$ and a receive read timing signal $\overline{RTR}$ from elastic store 11 to provide a phase error signal to control receive phase locked loop circuit 12. The gated conditioned diphase modulator 13 is gated by the enable signal "ENABLE FOR A" to the retimer 56 and hence the data output is CDP data for mode A and NRZ data otherwise. For mode D, the NRZ data is actually a reconstruction of the TTY data. The receive clock output 14 from binary divider 15 is enabled only for mode C (NRZ data mode). Tables I and II summarize the modes discussed hereinabove with respect to FIGS. 1 and 2.

TABLE I

| MODE | CODE MA | MB | | | FOR TDDM |
|---|---|---|---|---|---|
| A | 0 | 0 | Conditioned Diphase | Extract clock from data | Conditioned Diphase |
| B | 1 | 0 | NRZ data only | | Not used |
| C | 1 | 1 | NRZ data/ clock in | | NRZ |
| D | 0 | 1 | NRZ data/ clock out | | TTY |

TABLE II

| MODE | TTL | TTY | MA | MB |
|---|---|---|---|---|
| A | NO | NO | 0 | 0 |
| C | YES | NO | 1 | 1 |
| D | NO | YES | 0 | 1 |

FIGS. 3 and 4, although shown in separate FIGS., is the logic diagram of a combined digital data transmit and receive channel elastic store having the same operation as the separate transmit and receive channel elastic stores of FIGS. 1 and 2. The transmit and receive channel elastic store may be realized in practice as an LSI (large scale integrated) circuit package employing low threshold MOS (metal oxide semiconductor) P-channel transistors in an enhancement mode.

The logic diagram of phase comparator 1, circuit 2, divider 3, demodulator 4, inverter 6, circuit 12, modulator 13, divider 15 and phase comparator 17 of FIGS. 1 and 2 are fully disclosed in a second allowed copending application of S. B. Cohen, J. M. Clark and A. H. Magnus, Ser. No. 571,677, filed Apr. 25, 1975, now U.S. Pat. No. 3,961,136, whose disclosure directed to FIGS. 3A, 3B and 3C, when organized as illustrated in 3D, and the description thereof are incorporated herein by reference.

One of each of the different logic symbols employed have been identified by an appropriate label in FIG. 3 to provide a logic symbol key for similarly shown logic symbols in FIGS. 3 and 4.

Referring to FIG. 3, the transmit write clock WCX at the output of NOT gate 18 toggles a three-stage transmit write counter 19 including RS-type flip-flops 20–22, which drives a one-of-eight decoder including N NAND gates 23–30, where N in the example illustrated is equal to eight. The decoder steers the bits of the data to be transmitted WDX, which has eight bits per word, into one of eight data storage devices 31. The storage devices 31 include flip-flops 32–39 in the form of NAND gates 40 and 41 interconnected as illustrated with two steering OR gates 42 and 43. OR gate 43 receives the data WDX in its true form and OR gate 42 receives the data WDX in its complemented form $\overline{WDX}$ through NOT gate 44.

A three-bit binary read counter 45 including RS-type flip-flop stages 46–48 controls an eight-bit binary multiplexer in the form of two 4-to-1 multiplexers 49 and 50 which steer the data bit from one of the data latches or flip-flops 32–39 to the transmit data bus $\overline{RDX}$. This is accomplished by coupling one input of NOR gate 52 to the Q output of multiplexer 4 and the other input of NOR gate 52 to the $\overline{Q}$ output of flip-flop 48 and by coupling one input of NOR gate 53 to the Q output of multiplexer 50 and the other input of NOR gate 53 to the Q output of flip-flop 48. The outputs of NOR gates 52 and 53 are each coupled to a different input of NOR gate 54 whose output is coupled to one input of NAND gate 51. The other input of NAND gate 51 is coupled to the conductor having the transmit port or channel timing signal $PTX_n$ thereon.

In general, write count W of the transmit read clock $\overline{RCX}$ steers a data bit into latch or flip-flop numbered W and the read count R steers data out of latch or flip-flop R plus four modulo eight. For test purposes, a reset signal $\overline{RSTX}$ is provided to reset both counters 19 and 45 to zero. Resetting counter 19 forces the elastic store (N storage devices 31) to a half-full state due to the interconnection between the three stages of counter 19, NAND gates 23–30 and flip-flops 32–39. (For the receive elastic store in FIG. 4, a similar signal $\overline{RSTR}$ is enabled when the receive system counters are out of frame synchronization.) The PH signal at the output of a comparator in the form of a D-type flip-flop 55 is produced in flip-flop 55 by sampling the most significant bit of write counter 19 on the rising edge of the most significant bit of read counter 45. When the signal PH equals a binary "1" it is sent on the $\overline{RSTM}$ conductor to the $\overline{WCX}$ source illustrated in FIG. 3B of the above-cited second copending application to select a slower write clock. When the signal PH is equal to a binary "0" a stuff request latch or flip-flop in the form of NAND gates 56 and 57 interconnected as illustrated is set. When this latch is set, pulses are generated on the stuff request bus $\overline{SR}$ during the time slots assigned to the channel or port by NAND gate 58. Stuff request bus $\overline{SR}$ is coupled to a stuff control circuit 22 as illustrated in FIG. 6A of the above-cited first copending application for control thereof. The pulse position of timing signal $PTX_n$ indicate the positions of these time slots. If the stuff command bus SC is low (do not stuff) during one of these time slots, the stuff request latch is reset by the output of NAND gate 59 and D-type flip-flop 55 is set to prevent the generation of pulses on stuff request bus $\overline{SR}$ and to enable the comparison to take place in flip-flop 55. If the stuff logic enable signal EX enables stuff logic circuit 8, a stuff bit is produced. This is accomplished by an enabling stuff logic enable signal EX and the stuff command signal CS in conjunction with NAND gates 60 and 61 which causes one of the port timing $PTX_n$ pulses to be inhibited from the transmit read clock $\overline{RCX}$. This inhibits the counting in read counter 45 which causes one of the storage latches or flip-flops of device 31 to be read twice. The second bit from the second read is a stuff bit. It should be noted that when one of the flip-flops of device 31 is read the first time, the read flip-flop still contains the bit that is read the first time since the counting of read counter 45 is inhibited. Thus, the same bit is present in the read flip-flop when it is read a second time.

Referring to FIG. 4, there is illustrated therein the logic diagram of the receive elastic store. It is similar to the transmit elastic store in that the receive write counter 62 including RS-type flip-flops 98, 99 and 100 is clocked by a receive write clock WCR which is derived from the destuff logic circuit 10 which includes a NAND gate 63 coupled to the destuff command bus DC and the destuff logic enable signal bus ER, a NOT gate 64 coupled to the receive port or channel timing signal $\overline{PTR_n}$, NAND gate 65 and NOT gate 66. The three RS-type flip-flops 98, 99 and 100 of write counter 62 drives a decoder in the form of eight NAND gates 67–74 which steers the bits of received data WDR into one of eight latches or flip-flops 75–82 in the data storage devices 83. As in the case of the storage devices of FIG. 3, the flip-flops or latches each include NAND gates 84 and 85 interconnected as illustrated and data steering OR gates 86–87. The true version of the bits of the receive data WDR are coupled to the OR gate 87 and the complement of the bits of the received data $\overline{WDR}$ provided by NOT gate 88 is coupled to OR gate 86 with the output of one of the decoding NAND gates serving as the other input of OR gates 86 and 87.

The three-bit binary receive read counter 89 including RS-type flip-flops 90, 91 and 92 drives an eight-bit multiplexer in the form of two four-bit multiplexers 93 and 94 which steers the data from one of the data bit latches or flip-flops 74–82 to a gate circuit under control of the output of flip-flop 92 of counter 85. This gate circuit includes NOR gates 95 and 96 and OR gate 97 to couple the data bit outputs of the multiplexers 93 and 94 to the receive data bus RDR.

The receive write timing signal $\overline{WTR}$ from the $\overline{Q}$ output of the last stage of write counter 62 and the receive read timing signal $\overline{RTR}$ from the $\overline{Q}$ output of stage 92 of counter 89 are coupled to phase comparator 17 of FIG. 2 to control the receive phase locked loop circuit 12.

While we have described above the principles of our invention in connection with specific apparatus it is to be clearly understood that this description is made only by way of example and not as a limitation to the scope of our invention as set forth in the objects thereof and in the accompanying claims.

We claim:

1. A transmit and receive digital data elastic store comprising:
   a transmit digital data elastic store including
   a first input for a plurality of N-bit data streams to be transmitted, each of said data streams to be transmitted having first different bit rates, where N is an integer greater than one;
   a first complementing means coupled to said first input to complement said plurality of N-bit data streams to be transmitted;
   first N storage means coupled in parallel to said first input and said first complementing means;
   first means coupled to each of said first N storage means and under control of a transmit write clock signal having a first given rate to steer each of the bits of said plurality of N-bit data streams to be transmitted into an appropriate different one of said first N storage means; and
   second means coupled to said first N storage means and under control of a transmit read clock signal having a second given rate to steer each of the bits stored in said first N storage means to a transmit data bus at a first predetermined constant bit rate;
   a receive digital data elastic store including
   a second input for a plurality of received N-bit data streams, each of said plurality of received data streams having a second predetermined constant bit rate;
   a second complementing means coupled to said second input to complement said plurality of received N-bit data streams;
   second N storage means coupled in parallel to said second input and said second complementing means;
   third means coupled to each of said second N storage means and under control of a receive write clock signal having a third given rate to steer each of the bits of said plurality of N-bit received data streams into an appropriate different one of said second N storage means; and
   fourth means coupled to said second N storage means and under control of a receive read clock signal having a fourth given rate to steer each of the bits stored in said second N storage means to a receive data bus at second different bit rates corresponding to said first different bit rates.

2. An elastic store according to claim 1, wherein said first means includes fifth means to produce a plurality of transmit write timing signals to cooperate in steering said bits of said plurality of N-bit data streams to be transmitted to said first N storage means, and
said second means includes sixth means to produce a plurality of transmit read timing signals to cooperate in steering said bits stored in said first N storage means to said transmit data bus, and further including
   a phase comparator coupled to said fifth and sixth means responsive to a selected one of said transmit write timing signal and a selected one of said transmit read timing signals to produce a phase error control signal; and
   logic circuitry coupled to said phase comparator, a third input for a stuff command signal and a fourth input for a transmit bus timing signal, said logic circuitry being responsive to said phase error control signal, said stuff command signal and said transmit bus timing signal to produce a stuff request signal.

3. An elastic store according to claim 2, wherein said phase comparator includes a D-type flip-flop.

4. An elastic store according to claim 1, wherein said first means includes
   a three stage binary counter under control of said transmit write clock signal, and
   an N stage decoder coupled to said binary counter and said first N storage means, where N is equal to eight.

5. An elastic store according to claim 1, further including logic circuitry responsive to a stuff command signal, a transmit bus timing signal and a stuff logic enable signal to provide said transmit read clock signal, where said stuff logic enable signal enables said logic circuitry.

6. An elastic store according to claim 1, wherein said second means includes
   a three stage binary counter under control of said transmit read clock signal,
   a multiplexer coupled to each of said first N storage means and the first and second stages of said binary counter, said multiplexer being under control of the first and second stages of said binary counter to remove bits stored in said first N storage means in a predetermined sequence, and
   logic circuitry coupled to said multiplexer, the last stage of said binary counter, and said transmit data bus, said logic circuitry being under control of a transmit channel timing signal, output signals of said multiplexer and the last stage of said binary counter to steer each of the bits stored in said first N storage means to said transmit data bus.

7. An elastic store according to claim 1, wherein said first means includes
   a first three stage binary counter under control of said transmit write clock signal, and
   an N stage decoder coupled to said first binary counter and said first N storage means, where N is equal to eight;
further including
   first logic circuitry responsive to a stuff command signal, a transmit channel timing signal and a stuff logic enable signal to provide said transmit read clock signal, where said stuff logic enable signal enables said first logic circuitry; and
said second means includes
   a second three stage binary counter coupled to said first logic circuitry and under control of said transmit read clock signal,
   a multiplexer coupled to each of said first N storage means and the first and second stages of said second binary counter, said multiplexer being under control of the first and second stages of said second binary counter to remove bits stored in said first N storage means in a predetermined sequence, and
   second logic circuitry coupled to said multiplexer, the last stage of said second binary counter, and said transmit data bus, said second logic circuitry being under control of a transmit channel timing signal, output signals of said multiplexer and the last stage of said second binary counter to steer each of the bits stored in said first N storage means to said transmit data bus.

8. An elastic store according to claim 7, wherein the last stage of said first binary counter produces a transmit write timing signal, and
the last stage of said second binary counter produces a transmit read timing signal; and
further including
   a phase comparator coupled to the last stage of said first binary counter and the last stage of said second binary counter responsive to said transmit write timing signal and said transmit read timing signal to produce a phase error control signal; and
   a third logic circuitry coupled to said phase comparator responsive to said phase error control signal, a stuff command signal and said transmit channel timing signal to produce a stuff request signal.

9. An elastic store according to claim 8, wherein said phase comparator includes a D-type flip-flop.

10. An elastic store according to claim 1, further including
    logic circuitry responsive to a destuff command signal, a destuff logic enable signal and a receive channel timing signal to provide said receive write clock signal, where said destuff logic enable signal enables said logic circuitry.

11. An elastic store according to claim 1, wherein said third means includes
    a three stage binary counter under control of said receive write clock signal, and
    an N stage decoder coupled to said binary counter and said second N storage means, where N is equal to eight.

12. An elastic store according to claim 1, wherein said fourth means includes
    a three stage binary counter under control of said receive read clock signal,
    a multiplexer coupled to each of said second N storage means and the first and second stages of said binary counter, said multiplexer being under control of the first and second stages of said binary counter to remove bits stored in said second N storage means in a predetermined sequence, and
    logic circuitry coupled to said multiplexer, the last stage of said binary counter and said receive data bus, said logic circuitry being under control of output signals of said multiplexer and the last stage of said binary counter to steer each of the bits stored in said second N storage means to said receive data bus.

13. An elastic store according to claim 1, further including
    first logic circuitry responsive to a destuff command signal, a destuff logic enable signal and a receive channel timing signal to provide said receive write clock signal, where said destuff enable signal enables said first logic circuitry;
said third means includes
    a first three stage binary counter coupled to said first logic circuitry and under control of said receive write clock signal, and
    an N stage decoder coupled to said first logic circuitry, said first binary counter and said second N storage means, where N is equal to eight; and
said fourth means includes
    a second three stage binary counter under control of said receive read clock signal,
    a multiplexer coupled to each of said second N storage means and the first and second stages of said second binary counter, said multiplexer being under control of the first and second stages of said second binary counter to remove bits stored in said second N storage means in a predetermined sequence, and
    second logic circuitry coupled to said multiplexer, the last stage of said second binary counter and said receive data bus, said second logic circuitry being under control of output signals of said multiplexer and the last stage of said second binary counter to steer each of the bits stored in said second N storage means to said receive data bus.

14. An elastic store according to claim 1, wherein said first means includes
   a first three stage binary counter under control of said transmit write clock signal, and
   a first N stage decoder coupled to said first binary counter and said first N storage means, where N is equal to eight;
further including
   first logic circuitry responsive to a stuff command signal, a transmit timing signal and a stuff logic enable signal to provide said transmit read clock signal, where said stuff logic enable signal enables said first logic circuitry;
said second means includes
   a second three stage binary counter coupled to said first logic circuitry and under control of said transmit read clock signal,
   a first multiplexer coupled to each of said first N storage means and the first and second stages of said second binary counter, said first multiplexer being under control of the first and second stages of said second binary counter to remove bits stored in said first N storage means in a predetermined sequence, and
   second logic circuitry coupled to said first multiplexer, the last stage of said second binary counter, and said transmit data bus, said second logic circuitry being under control of a transmit channel timing signal, output signals of said first multiplexer and the last stage of said second binary counter to steer each of the bits stored in said first N storage means to said transmit data bus;
further including
   third logic circuitry responsive to a destuff command signal, a destuff logic enable signal and a receive channel timing signal to provide said receive write clock signal, where said destuff logic enable signal enables said third logic circuitry;
said third means includes
   a third three stage binary counter coupled to said third logic circuitry and under control of said receive write clock signal, and
   a second N stage decoder coupled to said third logic circuitry, said third binary counter and said second N storage means; and
said fourth means includes
   a fourth three stage binary counter under control of said receive read clock signal,
   a second multiplexer coupled to each of said second N storage means and the first and second stages of said fourth binary counter, said second multiplexer being under control of the first and second stages of said fourth binary counter to remove bits stored in said second N storage means in a predetermined sequence, and
   fourth logic circuitry coupled to said second multiplexer, the last stage of said fourth binary counter and said receive data bus, said fourth logic circuitry being under control of output signals of said second multiplexer and the last stage of said fourth binary counter to steer each of the bits stored in said second N storage means to said receive data bus.

15. An elastic store according to claim 14, wherein the last stage of said first binary counter produces a transmit write timing signal, and
   the last stage of said second binary counter produces a transmit read timing signal; and
further including
   a phase comparator coupled to the last stage of said first binary counter and the last stage of said second binary counter responsive to said transmit write timing signal and said transmit receive timing signal to produce a phase error control signal; and
   fifth logic circuitry coupled to said phase comparator responsive to said phase error control signal, said stuff command signal and said transmit channel timing signal to produce a stuff request signal.

16. An elastic store according to claim 15, wherein said phase comparator includes
   a D-type flip-flop.

17. A transmit digital data elastic store comprising:
   a first input for a plurality of N-bit data streams to be transmitted, each of said plurality of data streams having different bit rates, where N is an integer greater than one;
   a complementing means coupled to said first input to complement said plurality of N-bit data streams to be transmitted;
   N storage means coupled in parallel to said input and said complementing means;
   first means coupled to each of said N storage means and under control of a transmit write clock signal having a first given rate to steer each of the bits of said plurality of N-bit data streams to be transmitted into an appropriate different one of said N storage means; and
   second means coupled to said N storage means and under control of a transmit read clock signal having a second given rate to steer each of the bits stored in said N storage means to a transmit data bus at a predetermined constant bit rate.

18. An elastic store according to claim 17, wherein said first means includes third means to produce a plurality of transmit write timing signals to cooperate in steering said bits of said plurality of N-bit data streams to be transmitted to said N storage means, and
   said second means includes fourth means to produce a plurality of transmit read timing signals to cooperate in steering said bits stored in said N storage means to said transmit data bus; and
further including
   a phase comparator coupled to said third and fourth means responsive to a selected one of said transmit write timing signals and a selected one of said transmit read timing signals to produce a phase error control signal; and
   logic circuitry coupled to said phase comparator, a second input for a stuff command signal and a third input for a transmit bus timing signal, said logic circuitry being responsive to said phase error control signal, said stuff command signal and said transmit channel timing signal to produce a stuff request signal.

19. An elastic store according to claim 17, wherein said first means includes
   a three stage binary counter under control of a transmit write clock signal, and
   an N stage decoder coupled to said binary counter and said N storage means, where N is equal to eight.

20. An elastic store according to claim 17, wherein said second means includes
- a three stage binary counter under control of said transmit read clock signal,
- a multiplexer coupled to each of said N storage means and the first and second stages of said binary counter, said multiplexer being under control of the first and second stages of said binary counter to remove bits stored in said N storage means in a predetermined sequence, and
- logic circuitry coupled to said multiplexer, the last stage of said binary counter, and said transmit data bus, said logic circuitry being under control of a transmit channel timing signal, output signals of said multiplexer and the last stage of said binary counter to steer each of the bits stored in said N storage means to said transmit data bus.

21. An elastic store according to claim 17, wherein said first means includes
- a first three stage binary counter under control of said transmit write clock signal, and
- an N stage decoder coupled to said first binary counter and said N storage means, where N is equal to eight;

further including
- first logic circuitry responsive to a stuff command signal, a transmit channel timing signal and a stuff logic enable signal to provide said transmit read clock signal, where said stuff logic enable signal enables said first logic circuitry; and said second means includes
- a second three stage binary counter coupled to said first logic circuitry and under control of a transmit read clock signal,
- a multiplexer coupled to each of said N storage means and the first and second stages of said second binary counter, said multiplexer being under control of the first and second stages of said second binary counter to remove bits stored in said N storage means in a predetermined sequence, and
- second logic circuitry coupled to said multiplexer, the last stage of said second binary counter, and said transmit data bus, said second logic circuitry being under control of a transmit channel timing signal, output signals of said multiplexer and the last stage of said second binary counter to steer each of the bits stored in said N storage means to said transmit data bus.

22. An elastic store according to claim 21, wherein the last stage of said first binary counter produces a transmit write timing signal, and
the last stage of said second binary counter produces a transmit read timing signal; and further including
- a phase comparator coupled to the last stage of said first binary counter and the last stage of said second binary counter responsive to said transmit write timing signal and said transmit read timing signal to produce a phase error control signal; and
- a third logic circuitry coupled to said phase comparator responsive to said phase error control signal, a stuff command signal and said transmit channel timing signal to produce a stuff request signal.

23. A receive digital data elastic store comprising:
an input for a plurality of received N-bit data streams, each of said plurality of data streams having a given constant rate;
a complementing means to complement said plurality of received N-bit data streams;
N storage means coupled in parallel to said input and said complementing means;
first means coupled to each of said N storage means and under control of a receive write clock signal having a first given rate to steer each of the bits of said plurality of received N-bit data streams into an appropriate different one of said N storage means; and
second means coupled to said N storage means and under control of a receive read clock signal having a second given rate to steer each of the bits stored in said N storage means to a receive data bus at different bit rates.

24. An elastic store according to claim 23, wherein said first means includes
- a three stage binary counter under control of said receive write clock signal, and
- an N stage decoder coupled to said binary counter and said N storage means, where N is equal to eight.

25. An elastic store according to claim 23, wherein said second means includes
- a three stage binary counter under control of said receive read clock signal,
- a multiplexer coupled to each of said N storage means and the first and second stages of said binary counter, said multiplexer being under control of the first and second stages of said binary counter to remove bits stored in said N storage means in a predetermined sequence, and
- logic circuitry coupled to said multiplexer, the last stage of said binary counter and said receive data bus, said logic circuitry being under control of output signals of said multiplexer and the last stage of said binary counter to steer each of the bits stored in said N storage means to said receive data bus.

26. An elastic store according to claim 23,
further including
- first logic circuitry responsive to a destuff command signal, a destuff logic enable signal and a receive channel timing signal to provide said receive write clock signal, where said destuff enable signal enables said first logic circuitry;

said first means includes
- a first three stage binary counter coupled to said first logic circuitry and under control of said receive write clock signal, and
- an N stage decoder coupled to said first logic circuitry, said first binary counter and said N storage means, where N is equal to eight; and said second means includes
- a second three stage binary counter under control of said receive read clock signal,
- a multiplexer coupled to each of said N storage means and the first and second stages of said second binary counter, said multiplexer being under control of the first and second stages of said second binary counter to remove bits stored in said N storage means in a predetermined sequence, and
- second logic circuitry coupled to said multiplexer, the last stage of said second binary counter and said receive data bus, said second logic circuitry being under control of output signals of said multiplexer and the last stage of said second binary counter to steer each of the bits stored in said N storage means to said receive data bus.

27. An elastic store according to claim 26, wherein the last stage of said first binary counter produces a receive write timing signal, and
the last stage of said second binary counter produces a receive read timing signal; and further including
a phase comparator coupled to the last stage of said first binary counter and the last stage of said second binary counter responsive to said receive write timing signal and said receive read timing signal to produce a phase error control signal.

* * * * *